United States Patent [19]

Gunmar et al.

[11] Patent Number: 5,293,640
[45] Date of Patent: Mar. 8, 1994

[54] METHOD FOR PLANNING RADIO CELLS

[75] Inventors: Krister Gunmar; Ulf Tegth, both of Haninge, Sweden

[73] Assignee: Televerket, Farsta, Sweden

[21] Appl. No.: 752,510

[22] PCT Filed: Feb. 26, 1990

[86] PCT No.: PCT/SE90/00130

§ 371 Date: Oct. 25, 1991

§ 102(e) Date: Oct. 25, 1991

[87] PCT Pub. No.: WO90/10342

PCT Pub. Date: Sep. 19, 1990

[30] Foreign Application Priority Data

Mar. 3, 1989 [SE] Sweden .................. 8900743-9
Mar. 3, 1989 [SE] Sweden .................. 8900744-7
Mar. 3, 1989 [SE] Sweden .................. 8900745-4

[51] Int. Cl.[5] ............................. H04B 15/00
[52] U.S. Cl. ......................... 455/33.1; 455/62; 455/63; 379/59
[58] Field of Search ............ 455/33.1, 62, 63, 67.1; 379/59

[56] References Cited

U.S. PATENT DOCUMENTS

| | | | |
|---|---|---|---|
| 4,128,740 | 12/1978 | Graziano | 455/33.1 |
| 4,550,443 | 10/1985 | Freeburg | 455/62 |
| 4,736,453 | 4/1988 | Schloemer | 455/62 |
| 4,780,885 | 10/1988 | Paul et al. | 455/62 |
| 4,783,780 | 11/1988 | Alexis | 455/33.1 |
| 5,038,399 | 8/1991 | Bruckert | 455/62 |
| 5,073,971 | 12/1991 | Schaeffer | 455/33.1 |
| 5,093,926 | 3/1992 | Sasuta | 455/62 |
| 5,179,722 | 1/1993 | Gunmar et al. | 455/33.1 |

Primary Examiner—Reinhard J. Eisenzopf
Assistant Examiner—Andrew Faile
Attorney, Agent, or Firm—Oblon, Spivak, McClelland, Maier & Neustadt

[57] ABSTRACT

The present invention relates to a method for planning radio cells. The method utilizes an exclusion matrix calculated on the basis of measured field strengths and an iterative allocating algorithm, which allows an adaptation of the cell planning to prevailing traffic demand. The method includes the following steps: the traffic demand is geographically estimated; an acceptable coverage of the traffic demand is produced with the aid of a number of cells with suitable transmitter powers and antenna arrangements; each cell is allocated a number of channels, which corresponds to the estimated traffic demand, having regard to a margin for acceptable blocking; coverage and interference measurements are carried out for the cells, which measurement results are stored in a measurement data base; an exclusion matrix is calculated on the basis of the measurement results, which matrix represents the interaction between the cells in the system; an allocating algorithm is iterated, which algorithm, by utilizing a random technique, provides different collections of channel allocations for the cells; if the channel allocation is not possible with regard to the number of channels in a given frequency band, a new attempt is made and the subsequent steps are repeated; if the number of channels was sufficiently high, a radio cell design is obtained which is acceptable from the point of view of interference and the point of view of blocking. The present invention also provides a method for constructing the exclusion matrix and a method for determining uplink interferences.

13 Claims, 10 Drawing Sheets

```
VALLINGBY    0.   X: 160640   162534  DOWNLINK INTERFERENCE
ODENPLAN     0.   Y: 657882   659589
```

COVERAGE DBM:
-93.0
C/I:
INTERFERENCE %
0.8

MEDIAN C:
-87.8
80-DEC C:
-80.2
MEDIAN I:
-120.7
80-DEC I:
-116.9

```
    1234
1   0XXA
2   X0..
3   X.0.
4   A..0
```

FIG. 6

```
    1234
1   0XXA
2   X0..
3   X.0.
4   A..0
```

STATION NR: 7,  0.0000  HAGALUND

| 1 | 2 | | 4 | 5 | 6 | | 8 | 9 | 10 | 11 | 12 | | 14 | 15 | 16 | | | 19 | 20 | 21 |
|---|---|---|---|---|---|---|---|---|----|----|----|---|----|----|----|---|---|----|----|----|
| 24 | 25 | | 26 | 29 | 30 | 33 | 33 | 36 | 38 | 41 | 43 | | 44 | 45 | | | | | | |
| o | o | | o | o | o | o | o | o | o | o | o | | o | o | o | | | o | o | o |
| o | o | | o | o | o | o | o | o | o | o | o | | o | o | o | | | o | o | o |
| o | o | | o | o | o | o | o | o | o | o | o | | o | o | o | | | o | o | o |
| 23 | | | | | | | | | | | | | | | | | | | | |
| o | o | | | | | | | | | | | | | | | | | | | |

STATION NR: 8,  0.0000  HALLONBERGEN

| 1 | 2 | | 4 | 5 | 6 | 7 | | 9 | 10 | | 13 | 14 | 15 | 16 | 17 | | 19 | 20 | 21 |
|---|---|---|---|---|---|---|---|---|----|---|----|----|----|----|----|---|----|----|----|
| 24 | 25 | | 30 | 31 | 33 | 34 | | 35 | 37 | | 38 | 41 | 44 | 45 | | | | | |
| o | o | | o | o | o | o | | o | o | | o | o | o | o | o | | o | o | o |
| o | o | | o | o | o | o | | o | o | | o | o | o | o | o | | o | o | o |
| o | o | | o | o | o | o | | o | o | | o | o | o | o | o | | o | o | o |

```
STATION NR: 11.  0.0000                    HANDEN
 1   2   4   5   6   7  10  11  12  13  14  15  17  22  23  24  25
26  29  30  35  36  38  39  41  43       
 o   o   o   o   o   o   o   o   o   o   o   o   o   o   o   o   o
 o   o   o   o   o   o   o   o   o   o   o   o   o   o   o   o   o
 o   o   o   o   o   o   o   o   o   o   o   o   o   o   o   o   o

STATION NR: 12.  0.0000                    HUDDINGE
 1   2   5   7   9  10  11  14  15  16  17  21  22  23  26  27
28  29  31  35  38  43
 o   o   o   o   o   o   o   o   o   o   o   o   o   o   o   o
 o   o   o   o   o   o   o   o   o   o   o   o   o   o   o   o
 o   o   o   o   o   o   o   o   o   o   o   o   o   o   o   o
```

FIG. 7e

STATION NR: 13, 0.0000    HOGDALEN

```
 2  5  6   8 10 11 14 17 21 22 26 35 38 44
              44          35 38    44
```

STATION NR: 14, 0.0000    HOTORGET S

METHOD FOR PLANNING RADIO CELLS

FIELD OF THE INVENTION

The present invention relates to a method for planning radio cells, particularly planning cells with control over the interaction between the cells in the system and the capability of channel allocations which vary in accordance with the traffic demand. The method utilizes field strength measurements and an allocating algorithm, which permits a simple adaptation of the cell system, that is to say increasing or decreasing the number of cells with altered traffic demand. In particular, the invention relates to the planning of mobile radio cells. The changes in the traffic demand can relate to diurnal variations in the traffic and more long-term variations due to changes in the route network and so forth.

The present invention also relates to a method for constructing an exclusion matrix for resource allocation in a radio system. The radio system can be unidirectional with communication in only one direction, for example a paging system, or bidirectional, for example a mobile radio system. In the application, a mobile radio system is preferably considered, but it is understood that the invention is also applicable to a unidirectional system. In a mobile radio system, it is of importance that the available frequence resources are used in such a manner that the system capacity is optimized under the condition that the customers obtain an acceptable quality. In a microcell system in a densely populated area, it is desirable that the channel allocation can be tailored to the actual traffic distribution. Such planning is a very demanding task and there are great gains to be made if the operator of the system has full control over the inherent interferences in the system. An improved quality and traffic handling in a given frequency range is, moreover, equivalent to an increased frequency economy.

The following prerequisites are given: a distribution of traffic demand over, for example, Stockholm, system parameters which define which C/I (carrier to interference) interference ratio is required for good reception and how much interference a receiver tolerates in adjoining channels, and a frequency band for the system with a limited number of channels. It is the object to distribute the channels to the different base stations in the given frequency range so that the quality of connection experienced by the customers satisfies the given minimum requirements.

The present invention further relates to a method for determining uplink interferences in a mobile radio system, that is to say determining the degree of interference in a cell with respect to interfering mobile units in another cell. STATE OF THE ART Earlier mobile radio cell planning methods were static methods, that is to say all cells are always operating with one and the same channel allocation. Since direct field strength measurements have not been utilized previously, there has been no check of the factual interference ratios and it has been difficult to make new channel allocations. It is an uneconomical utilization of the resources for all cells to be operating at all times.

In the art, the problem of resource allocation has been solved essentially as follows: a systematic description is given of all the restrictions which apply to channel distribution in the form of a so-called exclusion matrix. An exclusion matrix provides a description in symbolic form of how different base stations, or alternatively mobile units in different coverage areas, can coexist with respect to the same channel and with respect to the adjacent channel. Then allocation algorithms are used for finding exactly which channels the different base stations should have for the minimum requirements for the connection quality to be satisfied. The method is used little since it is difficult to characterize a large city with respect to wave propagation in such a manner that a useful field strength and interference field strengths can be predicted within a few dB at relevant points, for example along the main traffic routes. There are examples of attempts made with large prediction programs based on terrain models. In reality, however, there is no possibility of putting in information about how, for example, all antenna patterns look with their in reality extremely irregular patterns. Such attempts thus have a tendency to create completely unrealistic calculation volumes.

When determining degrees of interference in mobile radio systems, only the downlink interferences have previously been considered, that is to say disturbances from base stations in other cells. It has been assumed that this is sufficient, especially since there has not been any method for characterizing interference from the moving mobile units in other cells. However, it has been shown that there can be a significant difference between the downlink and uplink interferences. Normally, the degree of interference is greater in the uplink situation than in the downlink situation. This implies that a resource allocation can be constructed which has an acceptable degree of downlink interference but too high a degree of uplink interference, which naturally implies that the system is unacceptable overall.

SUMMARY OF THE INVENTION

According to the first aspect of the invention, there is complete control over interference ratios, that is to say the interaction in the system, at all times. The invention thus offers a method which provides for simple adaptation to the prevailing traffic demand.

According to the second aspect of the invention, basically simple and completely realistic methods are used for providing the wave propagation information which is suitable for calculating an exclusion matrix, for example for Stockholm. The exclusion matrix in turn makes it possible to run an allocation program, and channel allocations are obtained for a situation with very well known and desired interference ratios which ensure a good communication quality.

According to the third aspect to the present invention, it is now possible to determine in an effective way the degree of interference for an uplink case so that this problem can be remedied.

According to the invention, a method for planning radio cells is provided, according to which:

the traffic demand is estimated geographically;

an acceptable coverage of the traffic demand is produced with the aid of a number of cells with suitable transmitter powers and antenna arrangements;

coverage and interference measurements are carried out for the cells, which measurement results are stored in a measurement data base;

each cell is allocated a number of channels which corresponds to the estimated traffic demand having regard to a margin for acceptable blocking;

an exclusion matrix is calculated on the basis of the measurement results, which matrix represents the interaction between the cells in the system;

an allocating algorithm is iterated, which algorithm, by utilizing a random technique, provides different sets of channel allocations for the cells;

if it is not possible to allocate channels with respect to the maximum number of channels, a new attempt is made, and an acceptable radio cell design is obtained if the channel number was sufficiently high.

The present invention also provides a method for constructing the above exclusion matrix for optimum channel allocation.

The present invention further provides a method for determining uplink interferences in a mobile radio system.

Further features of the invention are specified in the subsequent claims.

BRIEF DESCRIPTION OF THE DRAWINGS

The invention will now be described in greater detail with reference to the attached drawings, in which.

DETAILED DESCRIPTION OF THE INVENTION

The invention will now be described in detail with reference to a mobile radio system.

The primary task of a mobile radio system is to handle mobile radio traffic and, for this reason, the first thing that has to be done in planning cells is to estimate how the traffic demand is geographically distributed. There may be cause for detailing how such a distribution is defined since the traffic demand at each geographical point in the working area of the radio system varies, for example with the times of day. It is clear that a type of distribution must be used in a system which adapts itself to the variations in the traffic hour after hour by shutting down cells not required for the particular occasion and using a channel allocation which is tailored to this situation, and another type of distribution for the situation where all cells are always operating with one and the same channel allocation. In the latter case, which is based on the present state of the art in existing mobile radio systems, the cells must be dimensioned for maximum loads with a margin which corresponds to acceptable average blocking either calculated per cell or over the whole system as a totality.

Secondly, the cell planning must ensure that there is coverage in each case where the main proportion of the traffic demand occurs. This in turn is determining for how the base station locations are selected and also which antennas will be used and how great the radiated power should be. Generally, only directional antennas are used. When the base station has been planned in this way, test measurements must be taken with respect to coverage and interference and arranged in a data base which includes the coverage and interference areas of all other base stations. Since at present almost the entire traffic demand is handled from the main routes in the path network, it is sufficient if the data base comprises coverage and interferences with respect to these main routes. The base station must include sufficiently many channels per cell in order to be able to handle the traffic demand in the coverage area.

In the next step, a so-called exclusion matrix is calculated for the entire mobile radio system in the geographic region in question, for example the Stockholm area.

The prerequisites are that there are a number of base stations each with its coverage area and a frequency band for the system with a limited number of channels. There is also a requirement for which C/I interference ratio is required for good reception and how much interference a receiver tolerates in adjoining channels. According to the invention, field strengths are measured along the important paths in the respective coverage areas. From the measured values are calculated cross-interference matrices which specify with numeric values the interference ratios between transmitters. From the cross-interference matrices are calculated exclusion matrices which specify in symbolic form the interference ratios between stations in different coverage areas, both mobile units and base stations. The channel allocation can be carried out with the heap of the union of the exclusion matrices.

Using a specially calibrated receiver equipment, the receiver power from all base stations is measured on the relevant traffic routes in the geographic area which is occupied by the mobile radio system. The measured field strengths provide for these measurements mean values over sections of 20 m (approximately 30 wavelengths) and each section is linked to a co-ordinate designation. The field strength values are represented in dBm in the measurement results of the received signal power. The measurements are not as voluminous as they appear since field strengths from up to 12 base stations can be registered at one time in the same process. It is quite possible to make all necessary measurements for a cell including coverage and interference range in one night. These type of measurements have already been carried out successfully in the Stockholm area.

The measurements provide knowledge on what potential power a receiver in a mobile unit should receive from different cells wherever the mobile unit is located in the geographic area. It is also easy to calculate the power potentially received at an arbitrary base station and originating from mobile units in the coverage area. Accordingly, the interference situation both of the mobile units and of the base stations is known.

The exclusion matrix thus provides a systematic description in symbolic form of how different base stations or alternatively mobile units in different coverage areas can coexist with respect to the same channel and with respect to adjacent channels. The appearance of the matrix depends on which limit values are set for interference an coverage. It is important to understand that although and exclusion matrix contains information on how channels can be arranged it is, nevertheless, not a frequency-based quantity but only describes the relations between field strengths in the space.

Since the interferences can be described on the one hand with respect to the base station receivers and on the other hand with respect to the receiver of the mobile units, there is an uplink matrix and a downlink matrix (naturally, only the downlink matrix is used in paging systems). If it were so that different channel allocations could be used in practice for uplinks and downlinks, these matrices, after symmetrization, could be used directly individually for constructing these allocations. However, it is intended to use the same allocation in both directions which implies that the allocating algorithms are applied to the union of these matrices.

Figure 1:
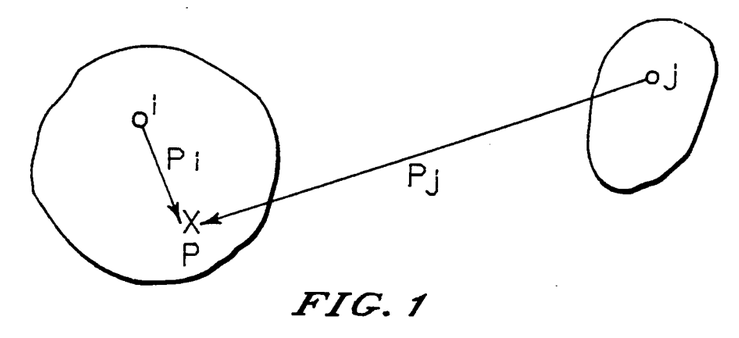
FIG. 1 illustrates how a mobile unit is exposed to interference from a neighboring base station.

The downlink situation is shown in FIG. 1. Assume that all the base stations together with the corresponding service areas are numbered from 1 to N. In FIG. 1, two stations i and j are shown with associated service areas. A mobile unit M in the i-th coverage area receives a wanted power Pi from its own base station and an unwanted interference power Pj from base station number j. There is a slight difference between the term "service area" and "coverage area". By coverage area are meant all measured paths which, with respect to a given base station, have a sufficiently high received power to permit satisfactory reception. In the service area, unmeasured points can be found which have good reception.

The minimum allowable C/I (carrier-to-interference) noise ratio for an acceptable co-channel quality is LP1 and the minimum allowable C/I for an acceptable quality with noise in the first adjacent channel is LP2 and so forth. For the $(k-1)$:st adjacent channel, C/I must be greater than LPk, $k \leq M$. The disabling interference figure p is defined as the fraction of the coverage area for which it holds true that $$Pj/Pi < LPk$$

$k = 1,2, \ldots M$

M is the number of necessary co-channel and adjacent-channel limit values.

The element Pij in a general N-th-order crost-interference matrix is given by the relation Pij(LPk) = p The diagonal elements are set to zero, that is to say Pii(LPk) = 0 for all i and k.

This cross-interference matrix P relates to the downlink situation and describes the degree of interference the mobile units are subject to with respect to the transmitting base stations.

Figure 2:
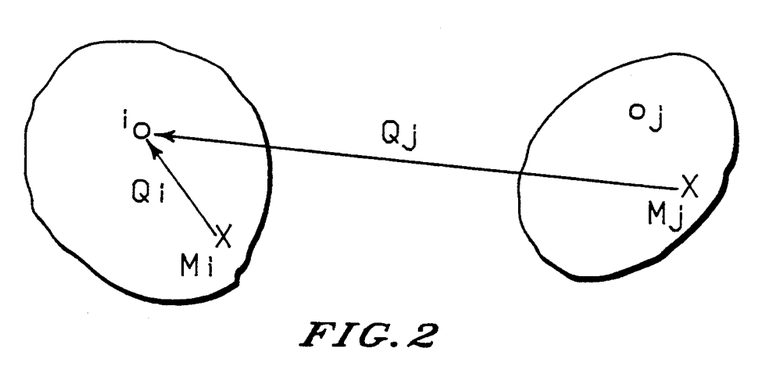
FIG. 2 illustrates how a base is exposed to interference from a mobile unit in a neighboring area.

FIG. 2 illustrates the uplink situation. The Figure shows two base stations i and j with associated service areas. In this case the base station i is exposed to interference Qj from a mobile unit Mj in the coverage area of base station j. Base station i receives a wanted power Qi from a mobile unit Mi in its coverage area. The coverage areas are defined in the same way as earlier or are possibly adjusted for any imbalance in the power budgets for up- and downlink.

When the mobile unit Mj is assumed to pass through the entire coverage area of base j, an interference power is generated in base station i. The interference power at base station i which for y % of the coverage area of base station j exceeds the interference power generated by the mobile Mj is designated by Qjy. Suitable values of y can be 50 or 90. The minimum allowable C/I noise ratio for an acceptable co-channel quality is designated by LQ1 and the minimum C/I for an acceptable quality for the first adjacent channel is designated by LQ2 and so forth. For the $(k-1)$:st adjacent channel, C/I must be greater than LQk, $k \leq M$, in the same way as before.

The disabling interference figure q is defined as the fraction of the coverage area for base i for which it holds true that $$Qi/Qjy < LQk$$

A general N-th-order exclusion matrix is defined by the relation

Qij(LQk) = q

The diagonal elements are set to zero in the same way as before, that is to say

Qii(LQk) = 0 for all i and k.

In this way, a cross-interference matrix is found for each $k = 1, 2 \ldots M$. This cross-interference matrix Q relates to the uplink situation and describes the degree of interference experienced by the receivers in the base stations with respect to the transmitting mobile units.

Alternatively, the uplink matrix can be calculated in the following way. When the mobile unit Mj in FIG. 2 passes through the entire coverage area of base j, an interference power is generated in base i. The interference power varies in dependence on the instantaneous position of the interfering mobile unit and these different interference power results can be statistically characterized by means of a distribution function.

a) The distribution function is calculated with a starting point from the measured field strength values. The interference values are generated by performing a randomization (Monte-Carlo method) according to the said distribution which can be implemented, for example, by allowing all interference results to be represented in table form and performing a uniform selection over all numerical values of the table. All the values are stored each in their storage location, and the selection is effected uniformly over all the addresses of the storage locations.

Assume that a mobile unit Mi passes through the coverage area i and that the base thereby receives the coverage field strength Qi and a random interference field strength Qj when the mobile unit is located at a given point in the coverage area. The disabling interference figure q (q is the element Qij(LQk) in the cross-interference matrix for the uplink) is defined as the fraction of the coverage area of base i for which it holds true that $$Qi/Qj < LQk.$$

Due to the fact that the interference field strength Qj is randomized, the ratio Qi/Qj becomes a stochastic variable. The consequence is that Q is also a stochastic variable which assumes new values each time the calculation is carried out. In practice, it is found that Q values calculated in this way are well assembled around their mean value and that a single result can be considered as being representative. If this should not prove sufficient, there is always the possibility of estimating the mean value of q by simulating the effect of the interfering mobile unit several times in the way described above.

b) The distribution function is approximated by means of a logarithmically normal distribution. It is well known in the literature that interference field strengths originating from mobile units situated at the same distance from the base have an almost logarithmically normal distribution. This also applies with good approximation to interference field strengths in a base from mobile units in an adjoining coverage area. The log-normal distribution is completely determined by mean value and deviation which parameters can be easily calculated from given measured interference field strengths. Compared with case a), it is not the distribution function which is thus calculated but only the mean value and deviation for the true distribution of the interference values. The true distribution is further approximated with a logarithmically normal distribution. The median for the true logarithmized interference field strengths can very welt be used as mean value in the log-normal distribution. The simulated interference powers are generated with the aid of a generator for normally distributed numerical values and with knowledge of the mean value and deviation as above. The elements Qij(LQk) in the cross-interference matrix are calculated analogously to what is specified in a) above.

The power values Q in the base stations from transmitting mobile units are directly relateable to the power values P from transmitting base stations due to the fact that the transmission losses between base and mobile unit are not dependent on the direction of transmission. Since P values are only obtained from measured wave propagation data, this also applies to Q values.

To calculate the frequency compatibility, each coverage area must be studied with respect to all the other coverage areas. This must be done for all the threshold values corresponding to the co-channel interference and adjacent-channel interference. This means that all the elements in all relevant cross-interference matrices must be calculated. In processing measurement data, it is generally unavoidable to calculate all the elements in the down- and uplink matrices for the cross-interferences with respect to at least the co-channel case and the case of interference in the first adjacent channel, that is to say two cross-interference matrices must be calculated for downlink and two for uplink.

To make an allocation program which functions with a starting point from cross-interference matrices gives excellent results but it is easier to edit and make changes in the matrices, which is necessary if the matarices are to be used in practice, if they have a simpler form with information which is not quite so detailed. This is the reason why it is intended to go over to a simplified representation which is here called exclusion matrix. In the matrix, a distinction is made between at least three different degrees of interference which are usually called ., X or A in increasing degree of dignity. The symbol "." designates a disturbance which is negligible. The diagonal has elements which are usually designated by 0 and which specify which base station rows or columns in the matrix relate to, for example 0 in row number i means that all interferences retate to the coverage area of base station number j.

From the cross-interferences for the downlink with elements Pij(LPk), for example, a corresponding exclusion matrix can be formed in the following way:

Assume that the limit values for the same channel and the first adjacent channel area the only relevant ones, which implies that there are two cross-interference matrices Pij(LP1) and Pij(LP2). If the exclusion matrix is designated by Uij and the limit value of the degree of disabling interference is px in both cases, the matrix element uij is obtained in the following way $$u_{ii} = \text{``0''}; i=j$$

$$u_{ij} = \text{``A''}; P_{ij}(LP2) > px$$

$$u_{ij} = \text{``X''}; P_{ij}(LP1) > px$$

$$u_{ij} = \text{``.''}; P_{ij}(LP1) \leq px$$

The matrix elements vij in the uplink matrix are formed in corresponding manner by using the cross-interference matrices Qij(LQ2) and Qij(LQ1) and corresponding limit value for the degree of disabling interference py.

Figure 3A:
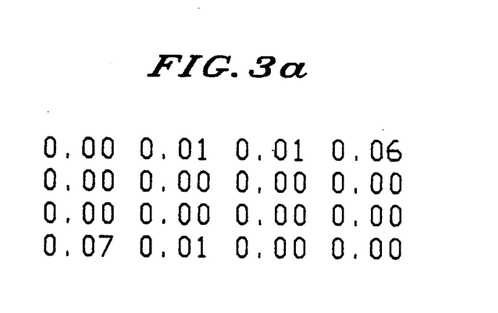
FIGS. 3a and 3b are examples of cross-interference matrices.
Figure 3B:
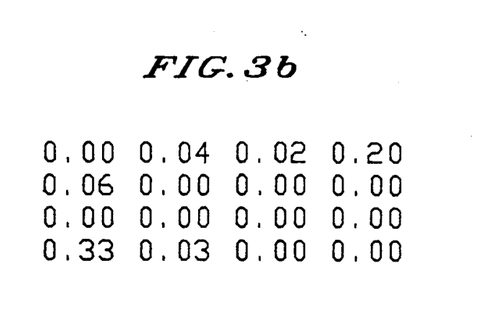

In FIG. 3a, an example of a cross-interference matrix Pij(LP2) is shown and in FIG. 3b a cross-interference matrix Pij(LP1) is shown. It holds true that Pij(LP2) ≤ Pij(LP1); for the rest, there is no connection between the matrices, and the matrices are not symmetrical either.

Figure 4A:
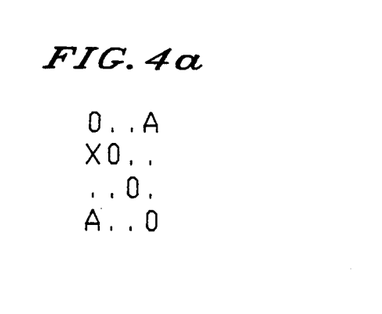
FIGS. 4a and 4b illustrate exclusion matrices belonging to the cross-interference matrices in FIGS. 3a and 3b, the matrix in FIG. 4b being a symmetrized downlink matrix.

By using the above method, an exclusion matrix can be calculated by means of the cross-interference matrices in FIGS. 3a and 3b for Px=0.05. The exclusion matrix is shown in FIG. 4a. The symbols ".", "X" and "A" correspond to interferences of increasing degree of dignity. An interference corresponding to is acceptable as co-channel interference. The symbol "0" indicates which coverage area the interferences in the same column relate to. The matrix according to FIG. 4a can be interpreted as follows. A mobile unit with coverage from base station 1 cannot share a channel for reception with a mobile unit in coverage areas 2 and 4. However, it can share a channel with a mobile unit in coverage area 3. A channel adjacent to a channel used by a mobile unit in coverage area 4 cannot be used by it. On the other hand, a mobile unit with coverage from base station 2 can share a channel for reception with a mobile unit in coverage area 1. A mobile unit in coverage area 2 is thus not exposed to interferences from base station 1, but a mobile unit in coverage area 1, is exposed to interferences from base station 2. Naturally, in practice this implies that the base stations 1 and 2 cannot use the same transmitting frequency. The consequence is that only symmetrical exclusion matrices have any practical value.

The exclusion matrix is therefore symmetrized by letting matrix elements which represent the stronger interference degree apply. If the matrix in FIG. 4a is symmetrized, the matrix in FIG. 4b is obtained which represents the downlink matrix in this case.

Figure 5:
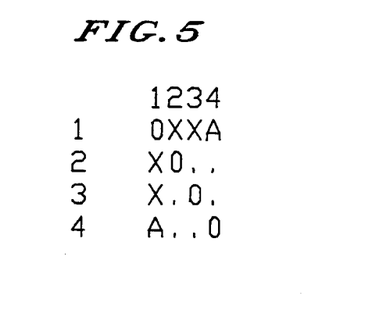
FIG. 5 illustrates an uplink matrix.

An example of an uplink matrix is given in FIG. 5. According to this matrix, the base station 1, in receiving mode, cannot share a channel with base stations 2, 3 and 4 and cannot have an adjacent channel to base station 4. Base station 2 is exposed to negligible interference from mobile units in the coverage areas of base stations 3 and 4 and can therefore share a channel with these base stations, and so forth.

As has been previously mentioned, one would like to have the same channel allocations in the uplink and downlink directins. To produce a matrix which can be used for forming the same allocation in both directions, the union of matrices U and V is defined. The union of two matrices is defined as the matrix with the union of corresponding elements in each matrix. The symbol for the union of two matrix elements is the symbol for the element which represents the stronger interference.

Figure 4B:
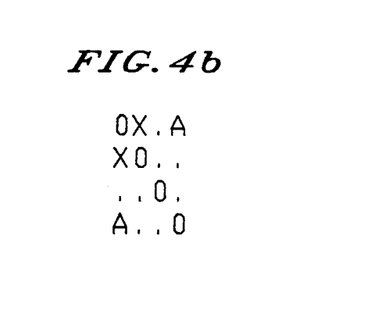
Figure 6:
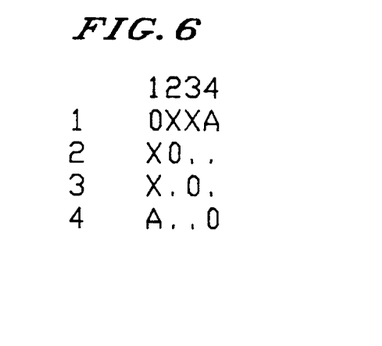
FIG. 6 illustrates an exclusion matrix belonging to the matrices in FIGS. 4b and 5, FIGS. 7(1/2) and 7(2/2) is an example of an exclusion matrix in table form.
Figure 7A:
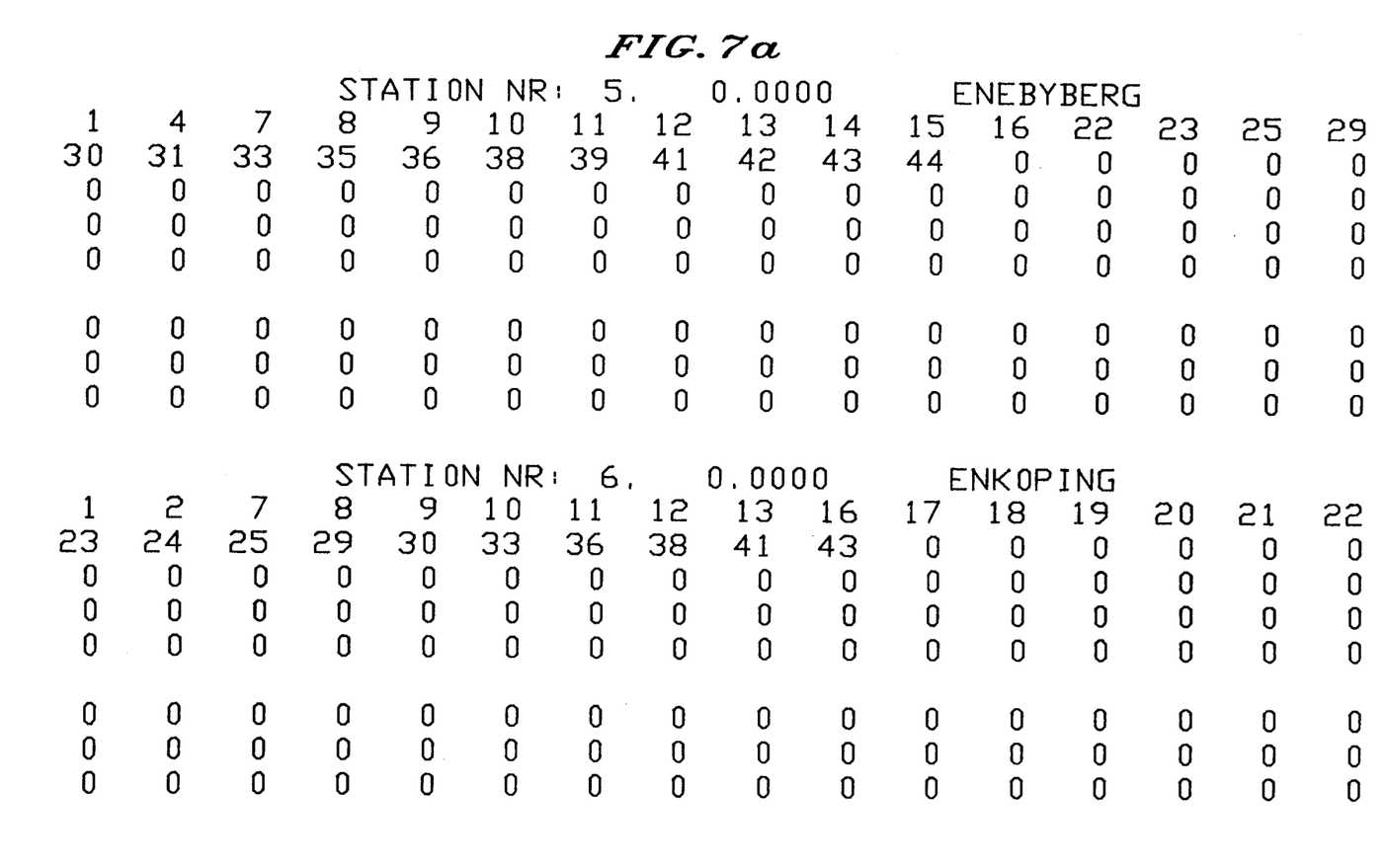
Figure 7B:
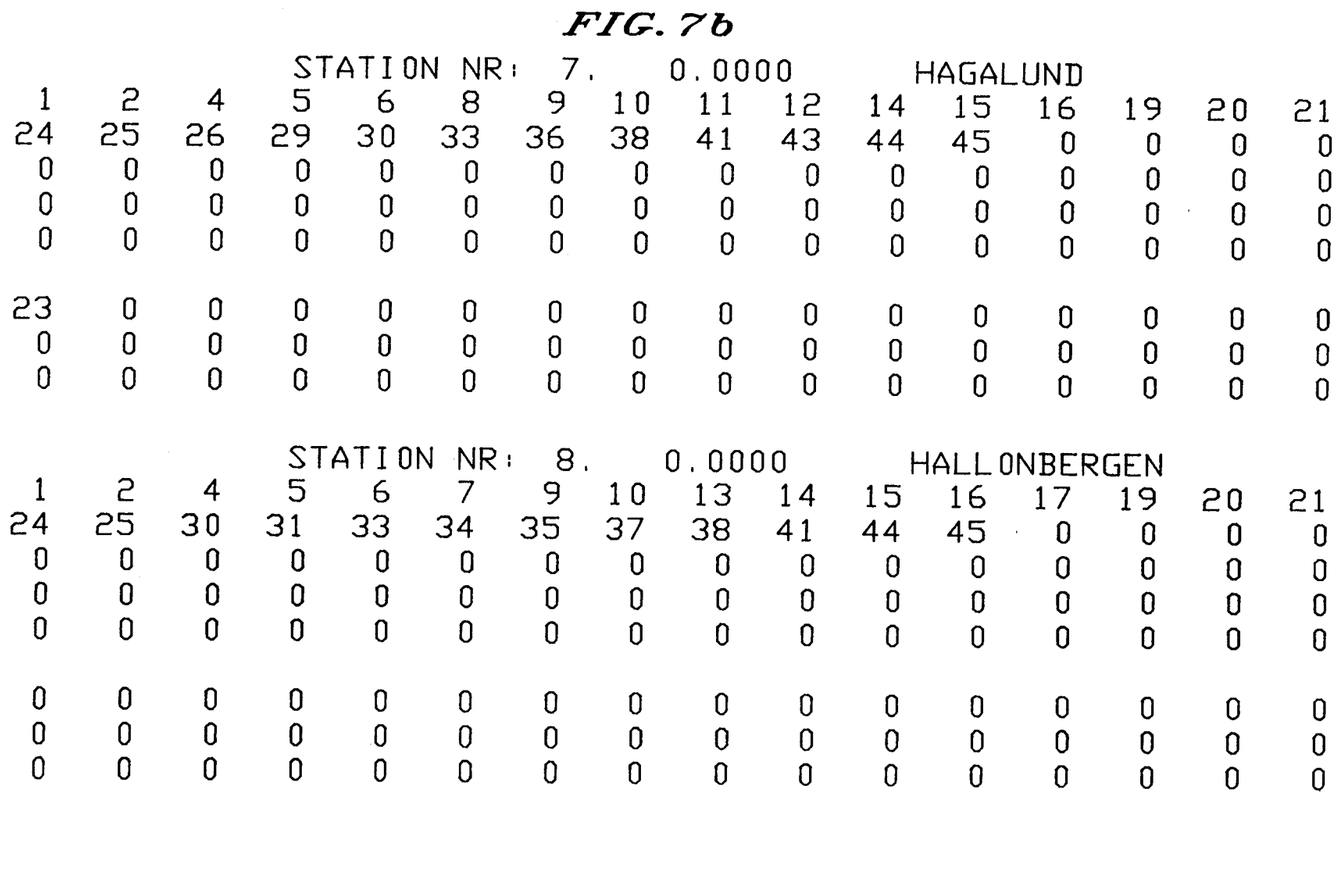
Figure 7C:
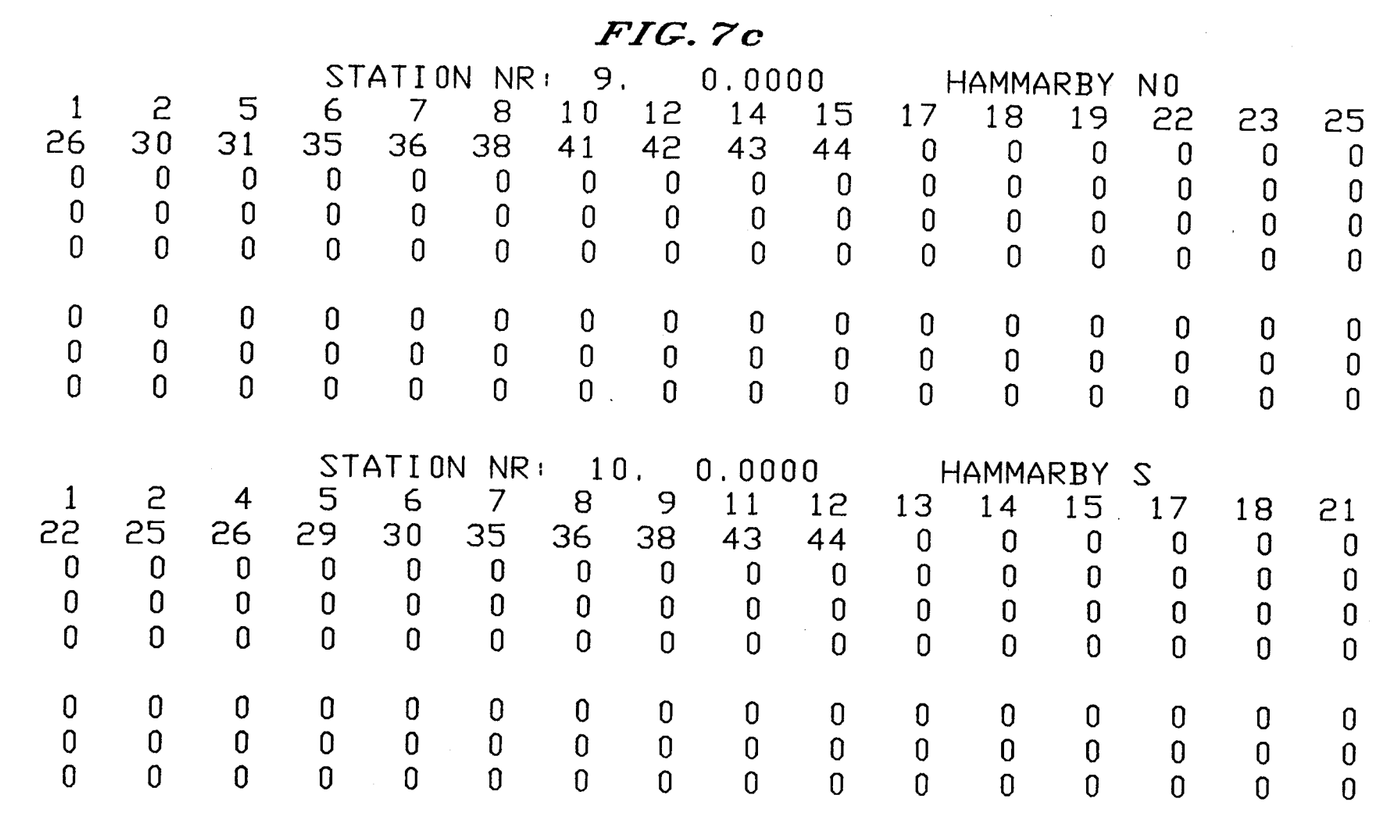
Figure 7D:
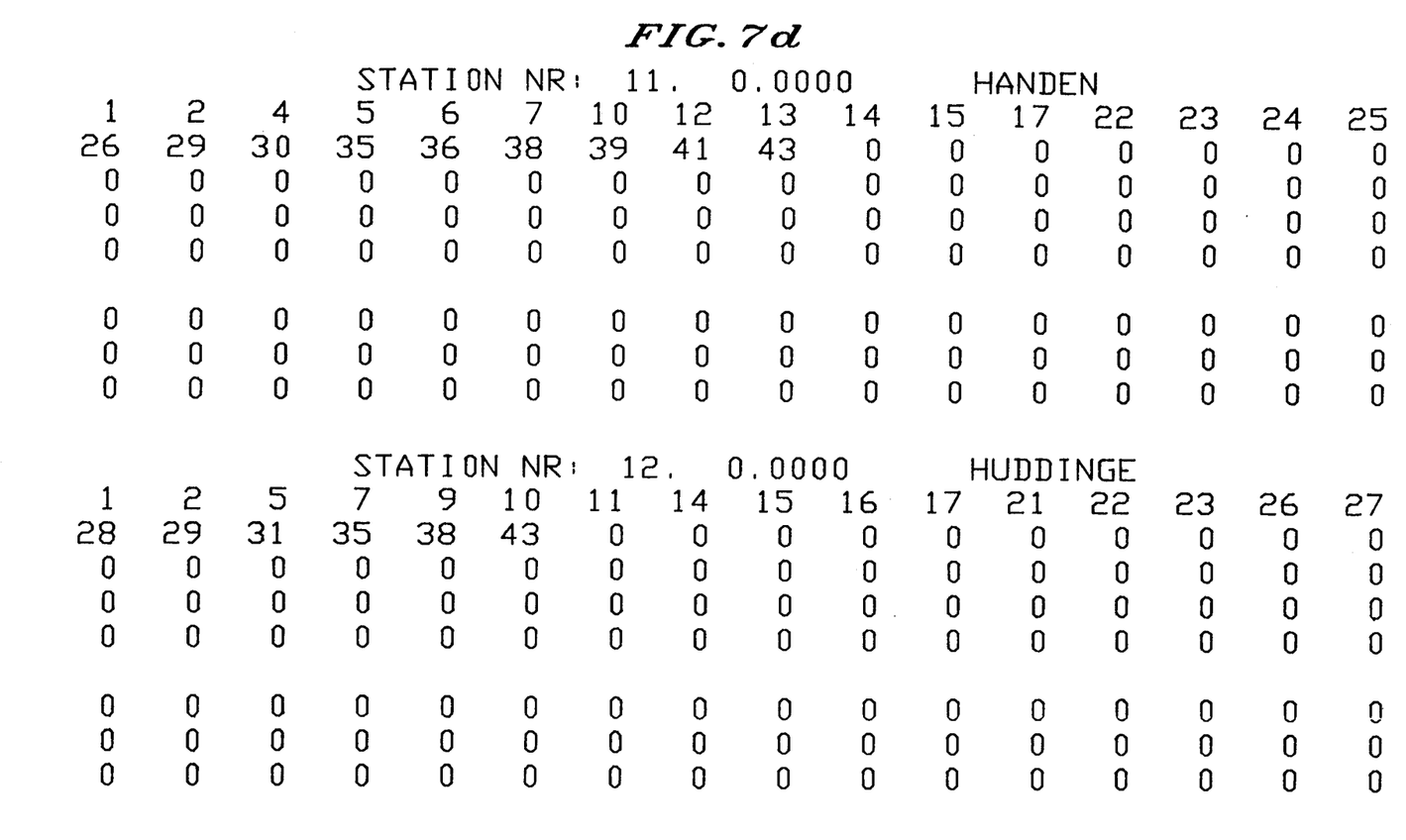
Figure 7E:
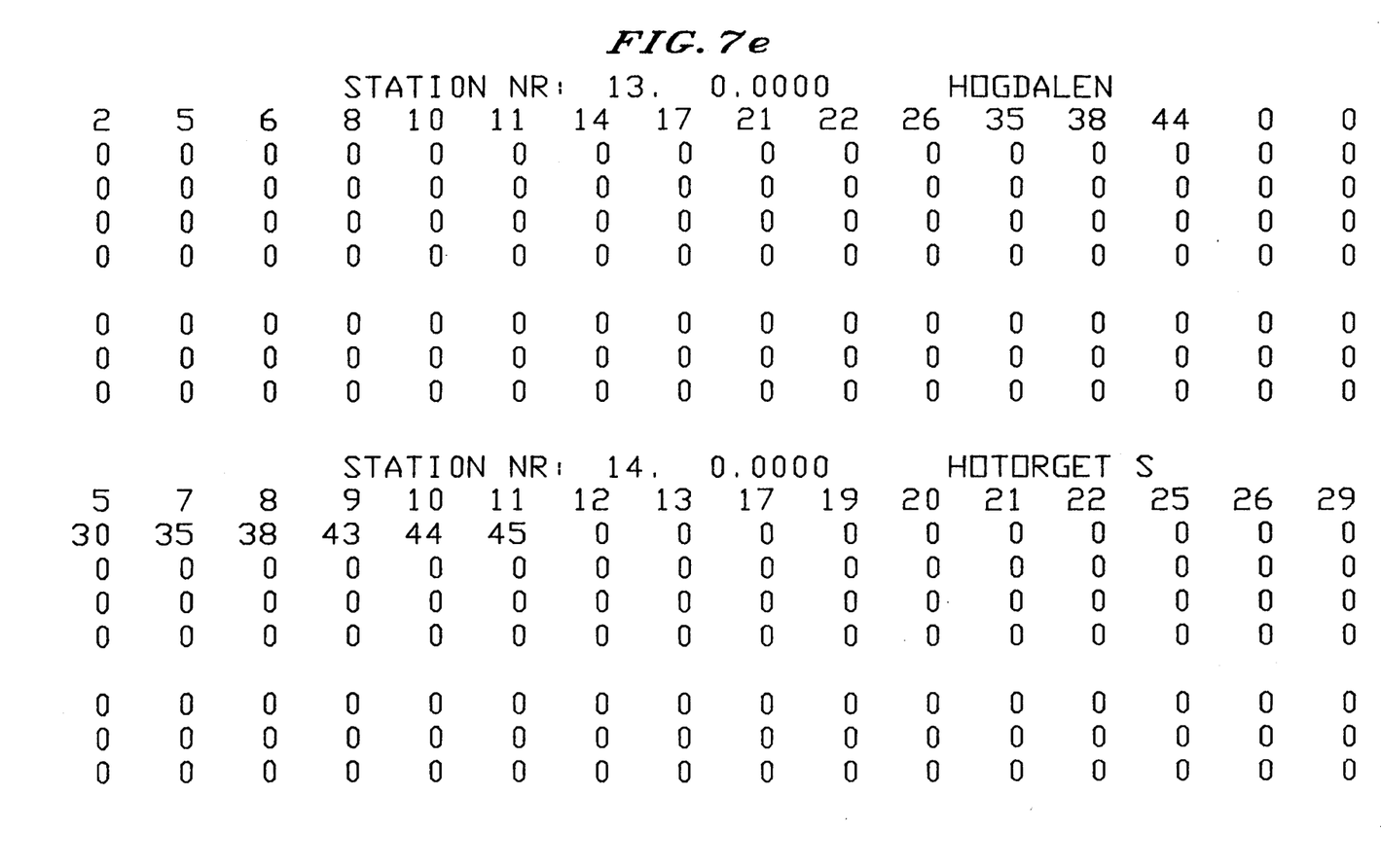

In FIG. 6, the union of the matrices in FIGS. 4b and 5 is shown. For the allocation of the channels, the exclusion matrix thus combined is used by combining its rows. If a certain control is desired so that small interference contributions which are individually allowed do not add up too much during the allocation, for example, a further two levels "Y" and "Z" can be introduced in the following manner. For the downlink matrix, the matrix element is set as $u_{ij}="0"; i=j$ $u_{ij}="A"; P_{ij}(LP2)>px$ $u_{ij}="X"; P_{ij}(LP1)>px$ $u_{ij}="Y"; px/2<P_{ij}(LP1)\leq px$ $u_{ij}="Z"; px/4<P_{ij}(LP1)\leq px/2$ $u_{ij}="."; P_{ij}(LP1)\leq px(4$ where px=the limit value of the degree of disabling interference in the same way as before. The exclusion matrix for the uplink situation can be formed in corresponding manner in certain cases. This is possible especially when the uplink interference is calculated with the aid of the statistical methods described earlier.

FIG. 7 shows an example of an exclusion matrix calculated for base stations in Stockholm. The matrix is represented in table form so that it can be read more easily. The X exclusions are specified in groups of five rows and the A exclusions in groups of three rows for each base station record. From this list, it can be read, for example, that Hagalund, as record number 7, cannot have the same channel as Hallonbergen at record number 8 due to the fact that 8 occurs as X exclusion at record number 7 and vice versa.

A further aid in the same resource allocation is a plotting program which produces plots of the interference situation. This is because the elements in an exclusion matrix belong to one of the following three classes:

1. Obvious non-exclusions, for example between cells at a very long distance from one another. It is sufficient to calculate that the coverage areas do not overtap one another, that is to say a trivial calculation.

2. Obvious exclusions between, for example, cells grouped together, that is to say cells which share the same mast or antenna. Collective groupings are found easily by comparing co-ordinates of the stations.

3. Uncertain pairs of cells where it is difficult to determine whether there is an exclusion or not. The set of uncertain pairs is a much smaller set than the set of all cell pairs.

Strictly speaking, in constructing an exclusion matrix, only the elements in the cross-interference matrices need be calculated which relate to uncertain cell pairs. This is suitably done by means of the algorithms specified earlier in combination with the plotting programs which present plots of down- and uplinks for cell pairs in question. For the uplink, the Monte-Carlo methods specified in a) and b) are to be preferred. The plotting programs calculate the degree of interference (the value of corresponding elements in the cross-interference matrix) and gives a visual illustration of the interference situation which provides an extremely accurate plan of the cell and its interaction with other cells. The planning can now be carried out not only with respect to the interference figure but also with respect to the total interference pattern and with system-related aspects in mind such as, for example, hand-over boundaries. It is possible to vary base station powers and power classes for mobile units and also individually to regulate the coverage for each cell. This can be done simultaneously both for down- and uplink. In addition, one need no longer be tied to a fixed limit value for the interference figure, but instead one can individually plan the cells with respect to the unique interference pattern.

For example, interferences do not give rise to any problems with normal traffic loading in cases where these interferences can be considered as belonging to the coverage area of another cell. The method is work-intensive but provides a result of extremely high quality.

The exclusion matrix allows a number of channel allocations to be constructed for the current system with the aid of so-called allocating algorithms, and this takes into account all existing relevant secondary conditions in the system with respect to limit values for co- and adjacent-channel interferences, adjoining boundaries with fixed allocations and so forth. A suitable method for channel allocation is specified in our international patent application "Method for channel allocation in a radio system" with the same filing date as the present application.

From the set of channel allocations, it can be assessed to what extent the traffic occurring in the newly planned cell can be handled within the given number of allowed channels. If this cannot be done, it can either be attempted to adjust the transmitter powers or antenna arrangement in an environment of the newly planned coverage area or the coverage area can possibly be divided up into a greater number of smaller cells. This is followed by a new calculation of the exclusion matrix and construction of further channel allocations. All situations which provide a number of channels within the maximum allowed number is considered as capable of implementation.

What has been described here is an interactive iterative procedure between man and computer. In principle, cells can always be added within the same frequency range provided that individual coverages are sufficiently small. The cost of this type of planning lies mainly in the number of new cells which must be added in order to absorb the newly added traffic demand. Each cell has a certain traffic handling capability and it is obvious that the traffic handled per unit area increases with increased number of cells.

The procedure is iterative and relates to a method with successive expansion of an existing mobile radio cell system with at least one base station in the initial stage. Naturally, for a number of already existing base stations, any of these can be set up for replanning according to the iterative procedure below. The overall strategy for the cell planning in question cannot be described with the aid of a "cookbook" but must be left to the operator's judgement and knowledge of the characteristics of the mobile radio system. The procedure includes the following main points:

1. Geographically estimating the traffic demand.
2. Achieving in a suitable manner and with the least possible resources in question with regard to transmitter power and antenna arrangement, one or several cells with coverage which captures an acceptable proportion of the traffic demand.

3. Carrying out coverage and interference measurements of the cell or cells. Updating the measurement data base with this information. Carrying out plotting of coverages of cells concerned and interferences in adjoining cells. The plots are done for interferences both from base to mobile (downlink) and for interferences from mobile to base (uplink). Interferences are calculated in plotting programs advantageously according to the methods for constructing an exclusion matrix and determining uplink interferences as set forth above. The interaction between cells, that is to say whether exclusion or not will exist with respect to channels, can be assessed with the aid of plots having regard to system aspects such as where hand-over boundaries should suitably be and so forth. With the aid of plotting programs, fine adjustments can thus be carried out with respect to power classes for mobile units and base station powers, the whole time with full control of coverage and degree of interference both in down- and uplink.

4. Planning the number of channels per cell which corresponds to the estimated traffic demand including a margin of acceptable blocking calculated, for example, for maximum traffic.

5. Calculating the exclusion matrix for a suitably large geographical area dependent on the interaction with the environment which the re- or new planning produces.

6. Using allocating algorithms of the Monte-Carlo type (random technique). Consideration is given to boundaries with allocations already made. A set of channel allocations is obtained which provides information on the possibility of implementing the new arrangement within the specified bandwidth.

7. If implementation is not possible, at least one of the added cells or a second existing cell must be divided up into smaller cells each of which has a smaller coverage area. The sum of the coverage areas should still provide the required coverage. The number of channels per new part-cell may need to be adjusted. The required coverage and traffic handling capability is obtained by repeating the procedure from item 2. If the lowest antenna power is not used in item 2, it may sometimes be sufficient to reduce the power in one or more cells for achieving a possibility of implementation. If implementation is possible, the problem is solved for the occasion but, on the other hand, may come up again on a later occasion by replanning having to be carried out for one reason or another, possibly with further cell multiplication.

8. Planning new cells or replanning existing ones. At items 6 and 7 above, it is practical to use a plotting program which produces plots of the interference situation in a coverage area with respect to interferences from a station (downlink) or mobile unit (uplink) in a second coverage area. The plot program calculates the degree of interference and provides a visual illustration of the interference situation which results in a further accurate planning of the cell and its interaction with other cells. Planning can now be carried out not only with respect to the amount of interference but also with regard to the overall interference pattern and taking into account the system aspects such as hand-over boundaries. It is possible to vary base station powers and power classes for mobile units and also to regulate the coverage individually for each cell. This can be done simultaneously both for down- and uplinks. It is also no longer necessary to be tied to a fixed limit value for the amount of interference but the cells can be planned individually with respect to the unique interference pattern. For example, interferences do not produce any problem with normal traffic loading in those cases where these interferences can be considered to belong to the coverage area of another cell. The method is work-intensive but produces a result with extremely high quality.

Figure 8:
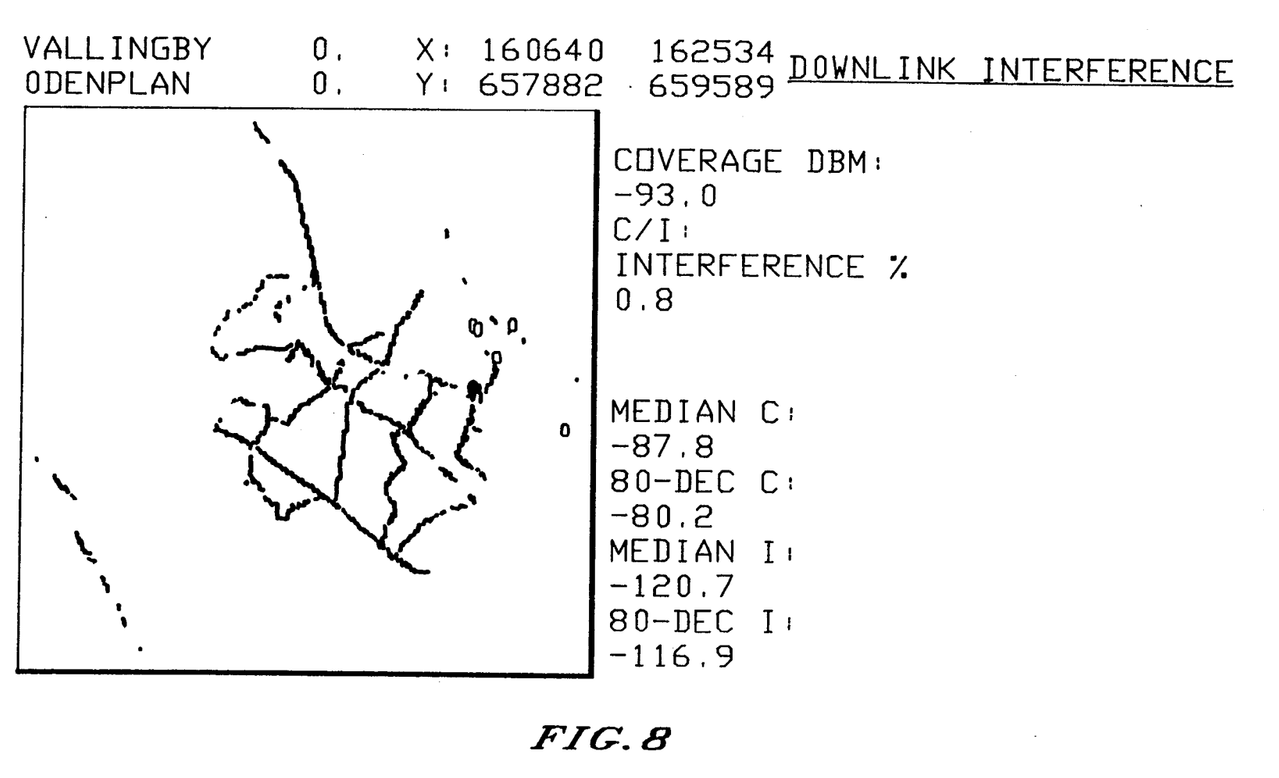
FIGS. 8-10 are examples of plots of different interference situations.
Figure 9:
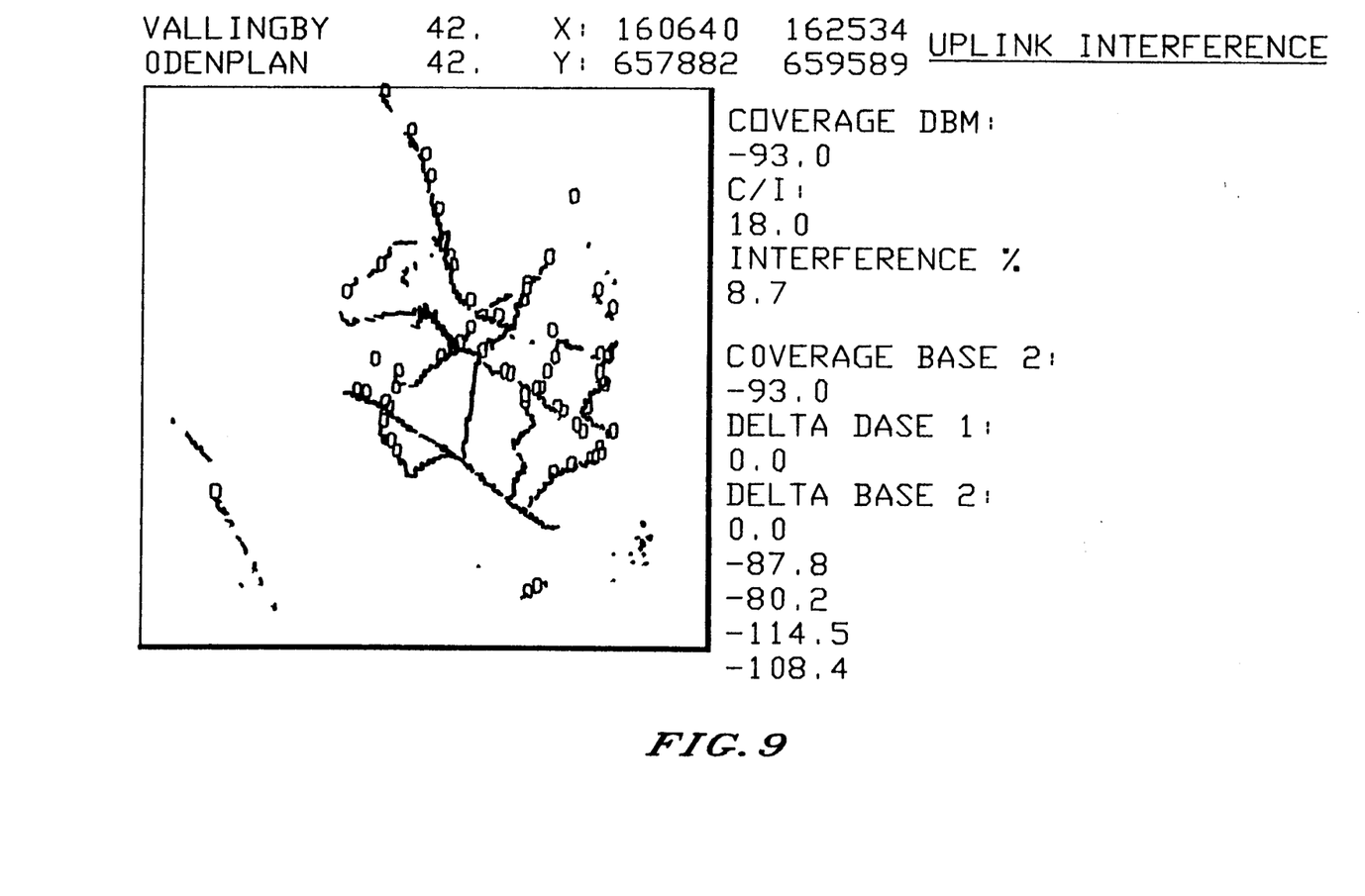
Figure 10:
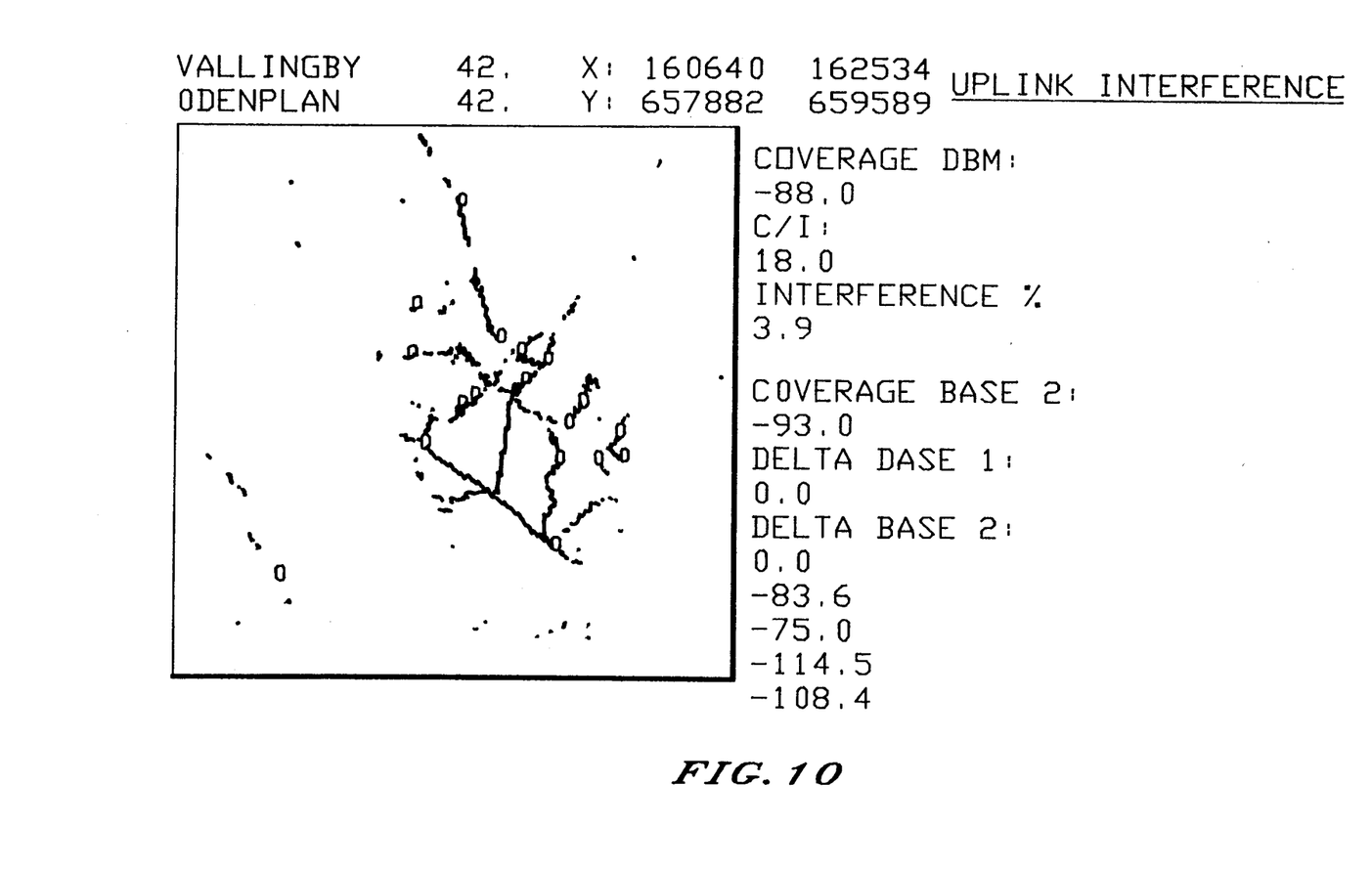

FIGS. 8–10 show plots of the service area of the base station in Vällingby with regard to interferences from the coverage area around the base station at Odenplan. The downlink situation is illustrated in FIG. 8, where the limit value for coverage is $-93$ dBm. The coverage is produced by plotted line segments, while interferences from Odenplan are designated by 0. The degree of interference (i.e. the element in the cross-interference matrix) is calculated as 0.8%.

FIG. 9 shows a plot of a corresponding situation for the uplink. It is thus a picture of how the mobile units in the coverage area of the base station at Odenplan interfere with the base station in Vällingby. The degree of interference is here approximately ten times greater than in the downlink which implies a situation which is not acceptable with respect to quality.

FIG. 10 shows a plot of the uplink situation when the limit value for coverage has been increased to $-88$ dBm. The coverage area has been slightly reduced but the interference situation has become acceptable with a degree of interference of about 4%, that is to say less than half compared with FIG. 9.

The FIGS. 8–10 thus show that it is not sufficient only to consider the downlink interferences since, in the example above, the degree of interference was ten times greater in the uplink case. If this situation had been allowed, the communication in the uplink, that is to say from a mobile unit to another subscriber, would have been disturbingly bad even if the communication in the other direction had been acceptable.

Naturally, the procedure described cannot be repeated ad absurdum. When the cells are very small, hand-over occurs very frequently which becomes disadvantageous. When the cells have a diametric extension of approximately one kilometer, the lower limit is reached and the system cannot be extended for further increased capacity. Naturally, it can occur that replanning is sometimes carried out with the intention of reducing the system capacity for a geographical area. The same procedure which has been described above can also be used in this case. A reduced estimated traffic demand in this case leads to fusions of cells or cell enlargements, in which respect base stations can be taken out of operation.

According to the embodiment of the invention described here, measured field strength values have been used for constructing the exclusion matrix. However, the invention does not exclude calculated field strength values being used if these are available. The invention is limited only by the claims below.

We claim:

1. A method for planning a plurality of radio cells, each radio cell having a transmitter and antenna arrangement, in a predetermined geographic area, comprising the steps of:

estimating a traffic demand for the plurality of radio cells in the predetermined geographic area;

producing a coverage of the estimated traffic demand by the plurality of radio cells with transmitter and antenna arrangements;

measuring coverage and interference values for each of the plurality of radio cells, which measurement results are stored in a measurement data base;

allocating to each of the plurality of radio cells a number of channels which corresponds to the estimated traffic demand, to generate a current allocation scheme;

calculating an exclusion matrix based on the measurement results, which extrusion matrix represents an interaction between the plurality of radio cells, including interference data between each of the plurality of radio cells; and assessing an extent to which the estimated traffic demand can be covered by the current allocation system.

2. The method for planning a plurality of radio cells according to claim 1, wherein if it is assessed that the estimated traffic demand can not be covered by the current allocation scheme, one or more of the plurality of radio cells is given a smaller coverage area.

3. The method for planning a plurality of radio cells according to claim 1, wherein if it is assessed that the estimated traffic demand cannot be covered by the current allocation scheme, at least one of the plurality of radio cells is given a greater or smaller coverage either by respectively increasing or reducing its transmitter power.

4. The method for planning a plurality of radio cells according to claim 1, wherein if it is assessed that the estimated traffic demand can not be covered by the current allocation scheme, at least two of the plurality of radio cells are combined to be given a greater coverage than a coverage of the combined radio cells individually.

5. The method for planning a plurality of radio cells according to claim 1, wherein if it is assessed that the estimated traffic demand can not be covered by the current allocation scheme, at least one of the plurality of radio cells is allocated a different number of channels.

6. The method for planning a plurality of radio cells according to claim 1, further comprising movable units for communicating with the plurality of radio cells;

wherein the measured interference values are obtained by measuring field strengths from all the plurality of radio cells on relevant traffic routes in the predetermined geographic area;

and wherein the exclusion matrix comprises a downlink matrix which describes the interference ratios between the plurality of radio cells at a predetermined receiving mobile unit, each downlink matrix element referring to a relationship between two interfering radio cells by at least one cross-interference matrix being formed by setting the matrix element $$P_{ij}(LP_k) = P$$

where P is a fraction of a predetermined coverage area for which is holds true that $P_i/P_j < LP_k$, where $P_i$ is the power received at the predetermined receiving mobile unit from the radio cell allocated to the predetermined coverage area, and wherein $P_j$ is the power received at the predetermined receiving mobile unit from an interfering radio cell and $LP_k$ is a predetermined figure of merit.

7. The method for planning a plurality of radio cells according to claim 6, wherein the exclusion matrix further comprises an uplink matrix which describes interference ratios for transmitting mobile units and receiving radio cells, each uplink matrix element referring to a relationship between two radio cells;

and wherein the exclusion matrix is formed as a union of the downlink matrix and uplink matrix, the union of the downlink matrix and uplink matrix being defined as a matrix with a union of corresponding elements and a union of two matrix elements being defined as the element which represents the strongest interference.

8. The method for planning a plurality of radio cells according to claim 7, wherein the uplink matrix is formed by setting the matrix element $$Q_{ij}(LQ_k) = q$$

where q is the fraction of the predetermined coverage area for which $$Q_i/Q_j < LQ_k \text{ holds true,}$$

where $Q_i$ is the power received at the radio cell from a transmitting mobile unit within the area of coverage of the radio cell, $Q_j$ is a random interference field strength which represents the power received at the radio cell from an interfering transmitting mobile unit, and $LQ_k$ is a certain figure of merit.

9. The method for planning a plurality of radio cells according to claim 8, wherein said random interference field strength values $Q_j$ are related to geographic coordinates in a respective coverage area for the interfering transmitting mobile unit, and are represented by a statistical model which describes an instantaneous position of the interfering transmitting mobile unit.

10. The method for planning a plurality of radio cells according to claim 9, wherein the field strength values of the interfering transmitting mobile unit are represented in table form and a uniform selection is carried out over all values of the table.

11. The method for planning a plurality of radio cells according to claim 9, wherein the field strength values of the interfering transmitting mobile unit are represented by a logarithmically normal distribution function based on a mean value or the median and the deviation of the said interference field strength values.

12. The method for planning a plurality of radio cells according to claim 7, wherein the uplink matrix is formed by at least one cross-interference matrix being formed by setting the matrix element $$Q_{ij}(LQ_k) = q$$

where q is the fraction of the coverage area for which $$Q_i/Q_{jy} < LQ_k \text{ holds true,}$$

where $Q_i$ is the power received at the radio cell whose coverage area contains the transmitting mobile unit, $Q_{jy}$ is a power value, which, for 90% of a certain part of the coverage area of an interfering transmitting mobile unit, exceeds the interference power generated by the transmitting mobile unit, and $LQ_k$ is a certain figure of merit.

13. The method for planning a plurality of radio cells according to any of claims 6-12, wherein two cross-interference matrices are formed for each downlink matrix and uplink matrix, the figures of the merits LP1 and LQ1 relating to co-channel interferences and the figures of merit LP2 and LQ2 relating to interferences of the first adjacent channel.

* * * * *

UNITED STATES PATENT AND TRADEMARK OFFICE
CERTIFICATE OF CORRECTION

PATENT NO. : 5,293,640
DATED : March 8, 1994
INVENTOR(S) : Krister GUNMAR et al.

It is certified that error appears in the above-indentified patent and that said Letters Patent is hereby corrected as shown below:

Column 3, line 35, change "7(1/2) and 7(2/2) is an example" to --7a-7e are examples--.

Column 4, line 33, change "heap" to --help--;

line 67, change "and" to --an--.

Column 5, lines 42, change "crost" to --cross--.

Column 7, line 18, change "welt" to --well--;

line 48, change "matarices" to --matrices--;

line 60, change "i" to --j--.

Column 8, line 4, change "uii" to --uij--;

line 24, after "to" insert --"."--;

line 59, change "directins" to --directions--.

UNITED STATES PATENT AND TRADEMARK OFFICE
CERTIFICATE OF CORRECTION

PATENT NO. : 5,293,640

DATED : March 8, 1994

INVENTOR(S) : Krister GUNMAR et al.

It is certified that error appears in the above-indentified patent and that said Letters Patent is hereby corrected as shown below:

Column 9, line 17, change "px(4" to --px/4--.

Signed and Sealed this

Thirteenth Day of June, 1995

Attest:

BRUCE LEHMAN

Attesting Officer

Commissioner of Patents and Trademarks